(12) United States Patent
Stephenson et al.

(10) Patent No.: US 6,231,993 B1
(45) Date of Patent: May 15, 2001

(54) ANODIZED TANTALUM PELLET FOR AN ELECTROLYTIC CAPACITOR

(75) Inventors: Donald H. Stephenson, Williamsville; Martin D. Cymerman, Orchard Park; Barry C. Muffoletto, Alden, all of NY (US)

(73) Assignee: Wilson Greatbatch Ltd., Clarence, NY (US)

( * ) Notice: Subject to any disclaimer, the term of this patent is extended or adjusted under 35 U.S.C. 154(b) by 0 days.

(21) Appl. No.: 09/408,219

(22) Filed: Sep. 29, 1999

Related U.S. Application Data

(60) Provisional application No. 60/102,653, filed on Oct. 1, 1998.

(51) Int. Cl.$^7$ ..................................................... B32B 15/04
(52) U.S. Cl. ..................... 428/472.1; 205/189; 205/105; 205/106; 205/108; 205/171; 205/175; 205/325; 205/332; 205/917; 205/229
(58) Field of Search ..................... 205/189, 325, 205/332, 171, 229, 105, 106, 108, 175, 917; 428/472.1; 361/500

(56) References Cited

U.S. PATENT DOCUMENTS

| | | | |
|---|---|---|---|
| 4,436,599 | 3/1984 | Bissot et al. | 204/98 |
| 4,504,369 | 3/1985 | Keller | 204/67 |
| 4,571,287 | * 2/1986 | Okubo et al. | 204/37.6 |
| 4,921,584 | 5/1990 | Koski et al. | 204/67 |
| 5,131,987 | * 7/1992 | Nitowski et al. | 205/201 |
| 5,716,511 | * 2/1998 | Melody et al. | 205/324 |

OTHER PUBLICATIONS

B. Melody et al., "An Improved Series of Electrolytes For Use In The Anodization Of Tantalum Capacitor Anodes", CARTS, pp. 40–50, 1992. No month available.
D.M. Smyth et al., "Heat–Treatment of Anodic Oxide Films on Tantalum", Journal of the Electrochemical Society, vol. 110, No. 12, pp. 1264–1271, Dec. 1963.
D.M. Smyth et al., "Heat–Treatment of Anodic Oxide Films on Tantalum", Journal of the Electrochemical Society, vol. 110, No. 12, pp. 1271–1276, Dec. 1963.
D.M. Smyth et al., "Heat–Treatment of Anodic Oxide Films on Tantalum", Journal of the Electrochemical Society, vol. 111, No. 12, pp. 1331–1336, Dec. 1964.
D.M. Smyth et al., "Heat–Treatment of Anodic Oxide Films on Tantalum", Journal of the Electrochemical Society, vol. 113, No. 2, pp. 100–104, Feb. 1966.
D.M. Smyth et al., "Heat–Treatment of Anodic Oxide Films on Tantalum", Journal of the Electrochemical Society, vol. 113, No. 12, pp. 1271–1274, Dec. 1966.

* cited by examiner

*Primary Examiner*—Kathryn Gorgos
*Assistant Examiner*—Christopher Keehan
(74) *Attorney, Agent, or Firm*—Hodgson Russ LLP

(57) ABSTRACT

An anodized pressed valve metal powder pellet is described. The anodized pellet is particularly useful as an anode in an electrolytic capacitor having an improved breakdown voltage. The anodized pellet is formed by periodically holding the pellet at a constant voltage and allowing the current to decay over a period of time, or by turning the formation power supply off altogether during the anodization process. Either way provides an opportunity for heated electrolyte to diffuse from the anodized pellet.

23 Claims, No Drawings

ANODIZED TANTALUM PELLET FOR AN ELECTROLYTIC CAPACITOR

CROSS-REFERENCE TO RELATED APPLICATION

The present application claims priority based on provisional application Ser. No. 60/102,653, filed Oct. 1, 1998.

BACKGROUND OF THE INVENTION

1. Field of the Invention

The present invention generally relates to an anode for a capacitor, and more particularly, to an electrolytic capacitor including an anode of a valve metal having an improved breakdown voltage.

2. Prior Art

Conventional construction of an electrolytic capacitor consists of anodizing a sintered porous valve metal structure, such as a tantalum pellet, in an electrolyte. In the case of tantalum, this forms a dielectric film of tantalum pentoxide on the exposed surfaces of the pellet. The electrolyte is typically composed of phosphoric acid, ethylene glycol or polyethylene glycol and water.

For a thorough discussion of the anodization process for a tantalum structure, reference is made to B. Melody et al., "An Improved Series of Electrolytes For Use In The Anodization Of Tantalum Capacitor Anodes", CARTS, pp. 40–50, 1992. This article is incorporated herein by reference.

For a thorough discussion of a conventional anodized tantalum pellet, reference is made to D. M. Smyth et al., "Heat-Treatment of Anodic Oxide Films on Tantalum", Journal of the Electrochemical Society, vol. 110, No. 12, pp 1264–1271, December 1963; D. M. Smyth et al., "Heat-Treatment of Anodic Oxide Films on Tantalum", Journal of the Electrochemical Society, vol. 110, No. 12, pp. 1271–1276, December 1963; D. M. Smyth et al., "The Heat-Treatment of Anodic Oxide Films on Tantalum", Journal of the Electrochemical Society, vol. 111, No. 12, pp. 1331–1336, December 1964; D. M. Smyth et al., "The Heat-Treatment of Anodic Oxide Films on Tantalum", Journal of the Electrochemical Society, vol. 113, No. 2, pp. 100–104, February 1966; and D. M. Smyth, "The Heat-Treatment of Anodic Oxide Films on Tantalum", Journal of the Electrochemical Society, vol. 113, No. 12, pp. 1271–1274, December 1966. These publications are incorporated herein by reference.

A pressed tantalum powder pellet is a porous structure. During the prior art anodization process, the tantalum pellet is continuously oxidized to a desired formation voltage by applying a current to the pellet. Because the tantalum pellet is porous, the electrolyte is able to flow into the pellet where it becomes heated during the anodization process. Since the anodization process is continuous, the heated electrolyte is unable to readily flow out of the pellet. Instead, the temperature of the electrolyte continues to increase through out the course of the process. It is believed that heated electrolyte is responsible for cracks, fissures and similar imperfections formed in the oxide coating and inside the tantalum pellet. These faults degrade the voltage at which the anode can be charged to.

What is needed is an improved method for manufacturing a valve metal anode such as of the kind typically used in an electrolytic capacitor. Particularly, it is desirable to provide tantalum anodes with oxide coatings devoid of cracks, fissures and similar imperfections and, consequently, having breakdown voltages that are superior to those known in the prior art.

SUMMARY OF THE INVENTION

Valve metals include vanadium, niobium and tantalum, and when used as an anode in an electrolytic capacitor are typically in the form of a pressed powder pellet. For tantalum, the powder material can be provided by either the beam melt process or the sodium reduction process, as is well known to those skilled in the art.

Regardless of the process by which the valve metal powder was processed, pressed valve metal powder structures, and particularly tantalum pellets, are typically anodized in formation electrolytes consisting of ethylene glycol or polyethylene glycol, de-ionized water and $H_3PO_4$. These formation electrolytes have conductivities of about 2,500 $\mu$S to about 2,600 $\mu$S at 40° C. The other main type of formation electrolyte is an aqueous solution of $H_3PO_4$. This type of electrolyte has conductivities up to about 20,000 $\mu$S at 40° C.

Conventional practice has been to form the valve metal to a target formation voltage at a constant current. The current used depends on the electrolyte, the valve metal powder type and the size of the valve metal structure. Adjusting these parameters according to conventional practice is well within the knowledge of those skilled in the art. A target formation voltage is achieved when a coating of tantalum pentoxide is provided of a thickness sufficient to hold a charge of a desired voltage.

There are, however, problems with conventional valve metal anodization processing. Importantly, electrolyte inside the porous tantalum pellet becomes heated during the anodization process. Since the anodization process is continuous, the heated electrolyte is unable to readily flow out of the pellet. Also, tantalum pentoxide is a relatively poor thermal conductor. This causes "hot spots" to form inside the pellet in the vicinity of the heated electrolyte. These "hot spots" are sites of potential cracks, fissures and where voltage is likely to breakdown. Secondly, as the electrolyte becomes heated, its constituent balance changes. This effects the conductivity of the electrolyte, especially inside the anode pellet. An electrolyte of a greater or lesser conductivity than desired is detrimental to the anodization process. An electrolyte of a conductivity lesser or greater than that intended can result in the oxide coating forming faster or slower than anticipated, which can effect the breakdown voltage of the final product.

Accordingly, the present invention is an improved process for providing an anodized dielectric coating on a valve metal structure by periodically relieving heated electrolyte from inside the structure. This is done to prevent the formation of internal "hot spots" by replacing heated electrolyte inside the anodized structure with fresh material from the anodization electrolyte bath. That way, the present invention ensures that electrolyte conductivity both inside and outside the structure remains relatively constant throughout the anodization process.

DETAILED DESCRIPTION OF THE INVENTION

According to the present invention, problems prevalent in the prior art with anodizing a pressed valve metal powder structure are overcome by periodically diffusing the heated electrolyte from inside the structure. This is accomplished in a number of ways. One way is to periodically maintain the formation voltage for a period of time sufficient to allow the heated electrolyte inside the anode pellet to flow out before continuing the anodization process. In other words, the formation voltage is periodically held steady for a time sufficient to allow the electrolyte inside the pellet to diffuse and be replaced by fresh electrolyte from the anodization bath. Preferably, the formation voltage is held steady for about twenty minutes or more.

Electrolyte diffusion is also accomplished by turning off the formation power source and allowing the anodized pellet to rest for a period of time. Again, the diffusion time is at least about twenty minutes. A combination of holding the formation voltage and removing the formation voltage altogether can also be used with one or the other being alternated after successive formation steps, or in succession between two formation steps, or at periodic intervals.

In practice, it has been determined that for tantalum powder pellets produced by the sodium reduction method, removing the formation voltage and allowing the pellet to rest with no applied voltage is most beneficial. For a beam melt powder structure, a combination of periodically holding the formation voltage and turning the voltage off before initiating the next formation step is preferred. Again, it should be stressed that a combination of the two may also be useful, regardless whether the tantalum pressed powder material is produced by the sodium reduction method or is a beam melt product.

A typical formation protocol is performed in an electrolyte consisting, by volume, of: about 55% polyethylene glycol, about 44.9% to about 43.5% deionized water and about 0.1% to about 1.5% $H_3PO_4$. Such an electrolyte has a conductivity of about 2,500 $\mu S$ to about 2,600 $\mu S$ at 40° C. It is also within the scope of the present invention to increase the conductivity of the formation electrolyte to thereby reduce heat generation inside the anode pellet. For that purpose, an aqueous electrolyte of $H_3PO_4$ having a conductivity up to about 20,000 $\mu S$ 40° C. is useful.

According to the present invention, an anodization process using a pressed valve metal powder, such as pressed tantalum powder, that has been produced by the sodium reduction process preferably includes periodically turning the formation voltage off to allow the pellet to relax. This rest period provides time for heated electrolyte inside the pellet to cool and flow out of the pellet to be replaced by fresh, relatively cool electrolyte having a conductivity more closely matching that of the anodization bath.

During the present formation process of a sodium reduction pressed valve metal powder structure, the current is initially set in a range of about 8 to about 60 mA/gram amount of valve metal material. The formation voltage is then raised in intervals of about 10 to about 100 volts between periods when the formation voltage is turned off. The formation voltage is then turned off for at least 20 minutes to allow for cooling and electrolyte replenishment inside the anode pellet. It should also be pointed out that as the formation voltage gets closer to the target formation voltage, the voltage intervals for each formation step preferably become less and less. It is believed that as the formation voltage approaches the target formation voltage, the oxide coating on the anode pellet becomes thicker which reduces the permeability of the pellet. Therefore, the voltage intervals are preferably decreased and the no applied voltage rest intervals are increased.

An exemplary formation protocol for a sodium reduced tantalum powder pellet is as follows. Exemplary sodium reduction tantalum pellets are available from H.C. Starck Inc., Newton, Mass. under the "NH" family designation. In this exemplary protocol, the pellet has a weight of about eight grams and the desired target formation voltage is 231 volts. The formation electrolyte is of polyethylene glycol, de-ionized water and $H_3PO_4$ having a conductivity of about 2,500 $\mu S$ to about 2,600 $\mu S$ at 40° C. The protocol is as follows:

1. The power supply is turned on at an initial current of 80 mA until the voltage reached 75 volts. The power supply is then turned off for about three hours.
2. The power supply is turned back on at 80 mA, 75 volts and raised to 115 volts. The power supply is then turned off for about three hours.
3. The power supply is turned back on at 49 mA, 115 volts and raised to 145. The power supply is then turned off for about three hours.
4. The power supply is turned back on at 49 mA, 145 volts and raised to 175. The power supply is then turned off for about three hours.
5. The power supply is turned back on at 40 mA, 175 volts and raised to 205. The power supply is then turned off for about three hours.
6. The power supply is turned back on at 36 mA, 205 volts and raised to 225. The power supply is then turned off for three hours.
7. The power supply is turned back on at 36 mA, 205 volts and raised to 231. The pellet is held at 231 volts for about one hour to complete the formation process. The anodized pellet is then rinsed and dried.

If desired, the formation process is periodically interrupted and the anodized pellet is subjected to a heat treatment step. This consists of removing the anode pellet from the anodization electrolyte bath. The anode pellet is then rinsed and dried followed by heat treatment according to the previously referenced article by D. M. Smyth et al., "Heat-Treatment of Anodic Oxide Films on Tantalum", Journal of the Electrochemical Society, vol. 110, No. 12, pp. 1264–1271, December 1963.

If desired, the anodized tantalum pellet can be subjected to a DC leakage test and a capacitance ESR test, as is well known by those skilled in the art. These tests are designed to mimic the environment of the pellet as an anode in an assembled capacitor by checking the integrity of the anodized pellet.

An exemplary formation protocol for a beam melt tantalum powder pellet is as follows. Exemplary beam melt tantalum pellets are available from H.C. Starck Inc., Newton, Mass. under the "QR" family description. It should be pointed out that the procedure guidelines applicable to the sodium reduction processed pellets are also applicable to beam melt pellets. These include the current range of about 8 to 60 mA/gram amount of valve metal material, the formation voltage being raised in intervals of about 10 to about 100 volts between turning off the formation voltage or holding the formation voltage steady for at least 20 minutes.

In this example, the pellet has a weight of about 17 grams and the desired target formation voltage is 380 volts. The formation electrolyte is of polyethylene glycol, de-ionized water and $H_3PO_4$ and has a conductivity of about 2,500 $\mu S$ to about 2,600 $\mu S$ at 40° C. The protocol is as follows:

1. The power supply is turned on at a current of 170 mA until the voltage reaches 150. The pellet is held at this voltage for about three hours. Following this, the power supply is turned off for about one hour.
2. The power supply is turned back on at a current of 85 mA until the voltage reaches 225. The pellet is held at this voltage for about three hours. Following this, the power supply is turned off for about one hour.
3. The power supply is turned back on at a current of 50 mA until the voltage reaches 280. The pellet is held at this voltage for about three hours. Following this, the power supply is turned off for about-one hour.
4. The power supply is turned back on at a current of 25.5 mA until the voltage reaches 330. The pellet is held at this voltage for about three hours Following this, the power supply is turned off for about one hour.
5. The power supply is turned back on at a current of 25.5 mA until the voltage reaches 355. The pellet is held at this voltage for about three hours. Following this, the power supply is turned off for about one hour.
6. The power supply is turned back on at a current of 25.5 mA until the voltage reaches 380. The pellet is held at this voltage for about three hours followed by turning off the power for about one hour.

For an anode pellet intended to have a formation voltage rating of 405 volts, the above protocol is followed by:

7. The power supply is turned off for three hours. The power supply is then turned back on at a current of 25.5 mA until the voltage reached 405 volts. The pellet is held at this voltage for about three hours followed by turning off the voltage for about one hour.

In both the 380 volt rated anode and the 405 volt rated anode, the pellet is periodically rinsed and dried followed by heat treatment according to the previously referenced article by D. M. Smyth et al., "Heat-Treatment of Anodic Oxide Films on Tantalum". Finally, if desired, the thusly formed anode is subjected to DC leakage testing and capacitance ERS testing to verify the integrity of the anodized tantalum pellet.

It is appreciated that various modifications to the present inventive concepts described herein may be apparent to those of ordinary skill in the art without departing from the spirit and scope of the present invention as defined by the herein appended claims.

What is claimed is:

1. A method for anodizing a pressed valve metal structure to a target formation voltage, comprising the steps of:
    a) providing the pressed valve metal structure in an anodizing electrolyte;
    b) performing a first anodizing step by subjecting the structure to a first current until the structure reaches a first formation voltage less than the target formation voltage;
    c) diffusing the electrolyte from the structure by turning off the current for at least about 20 minutes; and
    d) performing a final anodizing step by subjecting the structure to a last current until the structure reaches the target formation voltage.

2. The method of claim 1 including further diffusing the electrolyte by holding the formation voltage for a period of time sufficient to allow the electrolyte to diffuse from the structure either before or after the current is turned off.

3. A method for anodizing a pressed valve metal structure to a target formation voltage, comprising the steps of:
    a) providing the pressed valve metal structure in an anodizing electrolyte;
    b) performing a first anodizing step by subjecting the structure to a first current until the structure reaches a first formation voltage less than the target formation voltage;
    c) diffusing the electrolyte from the structure by turning off the current for at least about 20 minutes;
    d) performing at least one subsequent anodizing step by subjecting the structure to a subsequent current until the structure reaches a subsequent formation voltage greater than the first formation voltage but less than the target formation voltage;
    e) diffusing electrolyte from the structure after the subsequent formation voltage is attained; and
    f) performing a final anodizing step by subjecting the structure to a last current until the structure reaches the target formation voltage.

4. The method of claim 3 including further diffusing the electrolyte from the structure by holding the formation voltage for a period of time sufficient to allow heated electrolyte to diffuse from the structure either before or after the current is turned off.

5. The method of claim 4 wherein the formation voltage is held for at least about 20 minutes.

6. The method of claim 3 including diffusing the electrolyte from the structure by a combination of turning off the current and holding the formation voltage for a period of time sufficient to allow electrolyte to diffuse from the structure.

7. The method of claim 3 including providing the electrolyte having a conductivity of about 2,500 $\mu$S to about 20,000 $\mu$S at 40° C.

8. The method of claim 3 wherein the electrolyte comprises an aqueous solution of ethylene glycol or polyethylene glycol and $H_3PO_4$.

9. The method of claim 3 wherein the valve metal is tantalum.

10. The method of claim 3 wherein the first current is in a range of about 8 mA/gram to about 60 mA/gram amount of the valve metal material.

11. The method of claim 3 wherein a voltage interval up to the first formation voltage and between the first formation voltage and subsequent formation voltages including the target formation voltage is about 10 volts to about 100 volts.

12. The method of claim 3 wherein the valve metal is tantalum provided by a sodium reduction process.

13. The method of claim 3 wherein the valve metal is tantalum provided by a beam melt process.

14. An anodized pressed valve metal structure characterized as having been anodized in an aqueous electrolyte comprising ethylene glycol or polyethylene glycol and phosphoric acid to a target formation voltage greater than about 330 volts in a first anodization step by the structure having been subjected to a first current until the structure reaches a first formation voltage less than the target formation voltage, followed by the electrolyte having been diffused from the structure by turning off the current for at least about 20 minutes, followed by the structure having been subjected to at least one subsequent current until the structure reaches the target formation voltage.

15. The anodized structure of claim 14 wherein the electrolyte is diffused by further holding at the formation voltage for at least about 20 minutes.

16. The anodized structure of claim 14 wherein the electrolyte is characterized as having been diffused from the structure by a combination of turning the current off and holding the formation voltage.

17. The anodized structure of claim 14 wherein the electrolyte has a conductivity of about 2,500 $\mu$S to about 12,000 $\mu$S at 40° C.

18. The anodized structure of claim 14 wherein the valve metal is tantalum.

19. The anodized structure of claim 14 wherein the first current is in a range of about 8 mA/gram to about 60 mA/gram amount of the valve metal material.

20. The anodized structure of claim 14 wherein a voltage interval up to the first formation voltage and between the first formation voltage and the target formation voltage is about 10 volts to about 100 volts.

21. The anodized structure of claim 14 wherein the valve metal is tantalum provided by a sodium reduction process.

22. The anodized structure of claim 14 wherein the valve metal is tantalum provided by a beam melt process.

23. The method of claim 1 including subjecting the structure to at least one heat treatment step outside the electrolyte between the first anodizing step and the final anodizing step.

* * * * *